United States Patent
Romanato

(10) Patent No.: US 10,557,428 B2
(45) Date of Patent: Feb. 11, 2020

(54) METHOD AND SYSTEM FOR PREDICTIVE CONTOL OF AN ELECTRIALLY HEATED AFTERTREATMENT SYSTEM

(71) Applicant: GM GLOBAL TECHNOLOGY OPERATIONS LLC, Detroit, MI (US)

(72) Inventor: Roberto Romanato, Settimo Torinese (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 15/989,232

(22) Filed: May 25, 2018

(65) Prior Publication Data

US 2019/0360415 A1 Nov. 28, 2019

(51) Int. Cl.
*F01N 9/00* (2006.01)
*F02D 41/02* (2006.01)
*F01N 3/20* (2006.01)

(52) U.S. Cl.
CPC ......... *F02D 41/025* (2013.01); *F01N 3/2013* (2013.01); *F01N 9/002* (2013.01); *F02D 41/029* (2013.01); *F01N 2900/1402* (2013.01); *F01N 2900/1404* (2013.01)

(58) Field of Classification Search
CPC ........ F01N 3/027; F01N 3/0275; F01N 3/028; F01N 2240/16; F01N 2550/22; F01N 2900/0602
See application file for complete search history.

(56) References Cited

U.S. PATENT DOCUMENTS

| | | | |
|---|---|---|---|
| 2010/0242449 A1* | 9/2010 | Paterson | F01N 3/023 60/286 |
| 2013/0219863 A1* | 8/2013 | Kamoshita | F01N 3/0256 60/274 |
| 2017/0256104 A1* | 9/2017 | Pradun | H05B 1/0244 |
| 2019/0186316 A1* | 6/2019 | Ono | B01D 53/9481 |

\* cited by examiner

*Primary Examiner* — Jonathan R Matthias
(74) *Attorney, Agent, or Firm* — Lorenz & Kopf, LLP

(57) ABSTRACT

Systems and methods are provided for controlling an aftertreatment system of a vehicle. A system operating mode is determined for an aftertreatment device having an electrical heating element. A weighting coefficient is set based on the determined system operating mode. An optimized electrical heat input and an optimized engine heat input are determined based on the weighting coefficient. The aftertreatment device is then controlled to a target temperature based on the optimized electrical heat input and the optimized engine heat input.

20 Claims, 2 Drawing Sheets

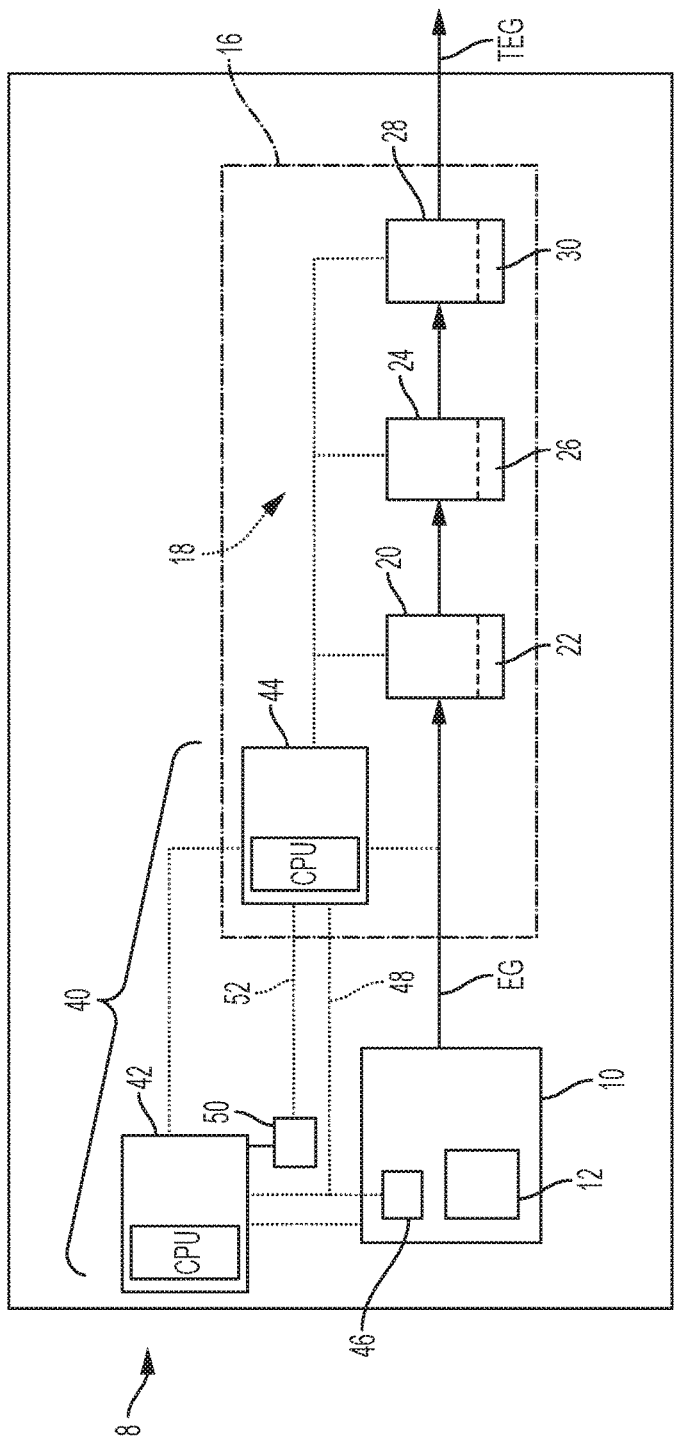
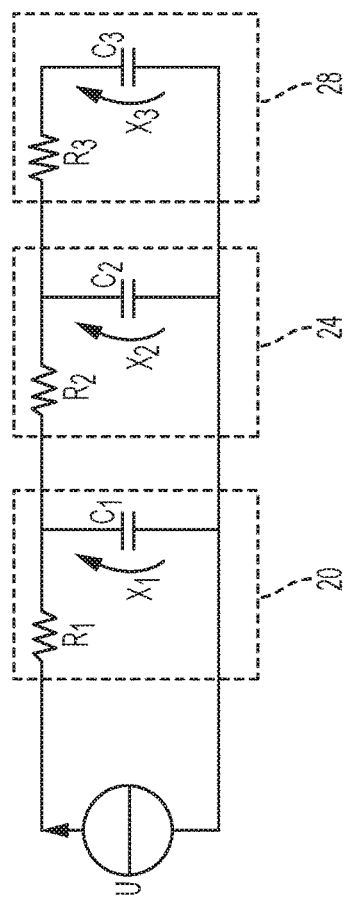
FIG. 1
FIG. 2

METHOD AND SYSTEM FOR PREDICTIVE CONTOL OF AN ELECTRIALLY HEATED AFTERTREATMENT SYSTEM

TECHNICAL FIELD

The present disclosure generally relates to aftertreatment systems for vehicles and methods of controlling aftertreatment systems, and more particularly to predictive control for operating an electrically heated device for aftertreatment.

BACKGROUND

Modern vehicles are often equipped with aftertreatment systems that are designed to treat post-combustion exhaust gases prior to tailpipe emission. On vehicles with diesel engines, the aftertreatment system can reduce combustion by-products such as particulate matter (PM) and nitrous oxide (NOx) from exhaust gases. Diesel aftertreatment systems may employ various devices including a diesel oxidation catalyst (DOCs), a diesel particulate filter (DPF), a selective catalytic reduction unit (SCR), ammonia oxidation catalysts (AOCs) and combinations thereof to reduce PM and NOx.

In general, exhaust gas treatment devices are designed to operate at relatively high temperatures that are commensurate with the temperature of the post-combustion exhaust gases. Accordingly, catalysts need to reach their respective operating temperatures to effectively and efficiently reduce emissions from the exhaust gases. As heated exhaust gases pass through the catalysts of the aftertreatment system, the catalysts are heated up from a starting or ambient temperature to an effective operating temperature range. In order to reduce emissions and shorten the warm up time, the aftertreatment device may include an electrical heater that uses electrical power to more rapidly heat the catalyst thereby reducing the length of time for the device to reach the effective operating temperature. However, on-board electrical energy is a highly managed resource that must be generated either by the engine as fueled electrical energy or recovered from vehicle motion as unfueled electrical energy.

Accordingly, it is desirable to provide systems and methods to control power for an electrically heated catalyst while improving overall engine efficiency by managing the operation of the electrically heated catalyst. These systems and methods should improve overall vehicle fuel economy while still reducing the emission of combustion by-products from the exhaust gases. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling an aftertreatment system of a vehicle. In an embodiment, a method is disclosed for controlling an exhaust gas aftertreatment system of a vehicle. Initially a system operating mode including a target temperature is determined for an aftertreatment device having an electrical heating element a weighting coefficient is set based on the determined system operating mode. An optimized electrical heat input is determined for the electrical heating element and an optimized engine heat input from post-combustion injection of fuel into the exhaust gas is determined based on the weighting coefficient. The electrical heating element is controlled based on the optimized electrical heat input and the post-combustion injection of fuel is controlled based on the optimized fuel heat input.

In an additional embodiment, the method includes providing a predetermined thermal model of the aftertreatment device and determining an optimized electrical heat input for the electrical heating element and an optimized engine heat input from post-combustion injection of fuel into the exhaust gas based on the thermal model.

In an additional embodiment, the method of claim 1, further comprising determining the optimized electrical heat input and the optimized engine heat input based on an optimized cost function.

In an additional embodiment, the method of claim 1, further comprising controlling at least one of an exhaust temperature and an exhaust flow rate based on the optimized engine heat input.

In an additional embodiment, at least one of an engine speed and an engine load is controlled based on the optimized engine heat input.

In an additional embodiment, a fuel flow equivalent is determined for activating the electrical heating element, and the optimized electrical heat input and the optimized engine heat input is determined based on the fuel flow equivalent.

In an additional embodiment, the method of claim 1, the optimized electrical heat input and the optimized fuel heat input minimizes a fuel consumption of the vehicle.

In an additional embodiment, the system operating mode is selected from a group consisting of: a catalyst light-up mode, a filter warm-up mode, a filter regeneration mode, a fuel efficiency mode, an electrical efficiency mode, or a combination thereof.

In an additional embodiment, a second system operating mode including a target temperature is determined for a second aftertreatment device having a second electrical heating element. A second weighting coefficient is determined based on the second system operating mode. A second optimized electrical heat input for the second electrical heating element and a second optimized engine heat input is computed from post-combustion injection of fuel into the exhaust gas based on the second weighting coefficient. The electrical heating element is controlled based on the second optimized electrical heat input and the post-combustion injection of fuel is controlled based on the second optimized fuel heat input.

In another embodiment, an exhaust system for an internal combustion engine having an engine control unit in communication configured to control an operating state of the engine. The exhaust system includes an aftertreatment device having an electrical heating element and an exhaust sensor network configured to measure an exhaust temperature, an exhaust flow rate, and an exhaust oxygen level. An electrical system is in communication with the electrical heating element and configured to supply electric power to the electrical heating element A heater control module is in communication with the electrical system and the engine control unit and configured to determine an optimized electrical heat input for the electrical heating element and an optimized engine heat input from post-combustion injection of fuel into the exhaust gas based on a system operating mode including a target temperature for an aftertreatment device and a weighting coefficient for the system operating mode, control the electric power supplied to the electrical heating element for generating an electrical heat input to the aftertreatment device based on the optimized electrical heat input, and instruct an engine control unit to control post-combustion injection of fuel based on the optimized fuel heat input.

In an additional embodiment, the heater control module is further configured to control the electrical heating element to a target temperature based on a predetermined thermal model for the aftertreatment device.

In an additional embodiment, the engine control unit is further configured to control at least one of an exhaust temperature and an exhaust flow rate based on the optimized engine heat input.

In an additional embodiment, the heater control module is further configured to determine a fuel flow equivalent for activating the electrical heating element, and determine the optimized electrical heat input and the optimized engine heat input based on the fuel flow equivalent.

In an additional embodiment, the heater control module is further configured to determine the optimized electrical heat input and the optimized engine heat input based on an optimized cost function.

In an additional embodiment, the optimized cost function J(k) is defined by:

$$J(k) = J_Y(k) + J_U(k)$$

wherein:

$$J_Y(k) = \sum_{i=1}^{p} \{w_{x1}[r_1(k+i|k) - x_1(k+i|k)]^2 + w_{x2}[r_2(k+i|x_2k) - x_2(k+i|k)]^2 + w_{x3}[r_3(k+i|k) - x_3(k+i|k)]^2\}$$

$$J_U(k) = \sum_{i=1}^{p} \{w_{U1}[U_{f1}(k+i|k)]^2 + w_{U2}[U_{f2}(k+i|k)]^2\}$$

wherein:
$x_1$=actual temperature of device 20;
$x_2$=actual temperature of device 24;
$x_3$=actual temperature of device 28;
$x_{m1}$=maximum temperature of device 20;
$x_{m2}$=maximum temperature of device 24;
$x_{m3}$=maximum temperature of device 28;
$r_1$=target temperature of device 20;
$r_2$=target temperature of device 24;
$r_3$=target temperature of device 28;
$U_{f1}$=fuel flow equivalent to activate the electrical heating element(s);
$U_{f2}$=fuel flow for post-combustion injections;
$W_{x1}$=weighting coefficient indicating importance of temperature for device 20;
$W_{x2}$=weighting coefficient indicating importance of temperature for device 24;
$W_{x3}$=weighting coefficient indicating importance of temperature for device 28;
$W_{U1}$=weighting coefficient indicating penalty for large changes in electrical heat input;
$W_{U2}$=weighting coefficient indicating penalty for large changes in engine heat input;
p=number of samples for the prediction horizon;
k=current sample time; and
the constraints are as follows:

$$\begin{bmatrix} x_1 \\ x_2 \\ x_3 \end{bmatrix} < \begin{bmatrix} x_{m1} \\ x_{m2} \\ x_{m3} \end{bmatrix}$$

In an additional embodiment, the system includes a particulate filter in communication with the exhaust system.

In an additional embodiment, the system operating mode is selected from a group consisting of: a catalyst light-up mode, a filter warm-up mode, a filter regeneration mode, a fuel efficiency mode, an electrical efficiency mode, or a combination thereof.

In another embodiment, a vehicle includes a diesel engine having an exhaust system and an engine control unit in communication with the diesel engine, the engine control unit configured to control an operating state of the diesel engine. An exhaust sensor network is in communication with the exhaust system, the sensor network configured to measure an exhaust temperature, an exhaust flow rate, and an exhaust oxygen level. An electrical system is in communication with the electrical heating element and configured to supply electric power to the electrical heating element. An aftertreatment system in communication with the exhaust system includes an aftertreatment device having an electrical heating element, and a heater control module in communication with the electrical system and the engine control unit. The heater control module is configured to determine an optimized electrical heat input for the electrical heating element and an optimized engine heat input from post-combustion injection of fuel into the exhaust gas based on a system operating mode including a target temperature for an aftertreatment device and a weighting coefficient for the system operating mode, control the electric power supplied to the electrical heating element for generating an electrical heat input to the aftertreatment device based on the optimized electrical heat input, and instruct an engine control unit to control post-combustion injection of fuel based on the optimized fuel heat input.

In an additional embodiment, the heater control module is further configured to determine a fuel flow equivalent for activating the electrical heating element, and determine the optimized electrical heat input and the optimized engine heat input based on the fuel flow equivalent.

In an additional embodiment, the system operating mode is selected from a group consisting of: a catalyst light-up mode, a filter warm-up mode, a filter regeneration mode, a fuel efficiency mode, an electrical efficiency mode, or a combination thereof.

BRIEF DESCRIPTION OF THE DRAWINGS

The exemplary embodiments will hereinafter be described in conjunction with the following figures, wherein like numerals denote like elements.

FIG. 1 is a schematic representation of a vehicle incorporating an after-treatment system applied to an internal combustion engine that is operable in accordance with the herein described embodiments;

FIG. 2 is a schematic representation of the thermal model for the aftertreatment devices;

DETAILED DESCRIPTION

Figure 3:
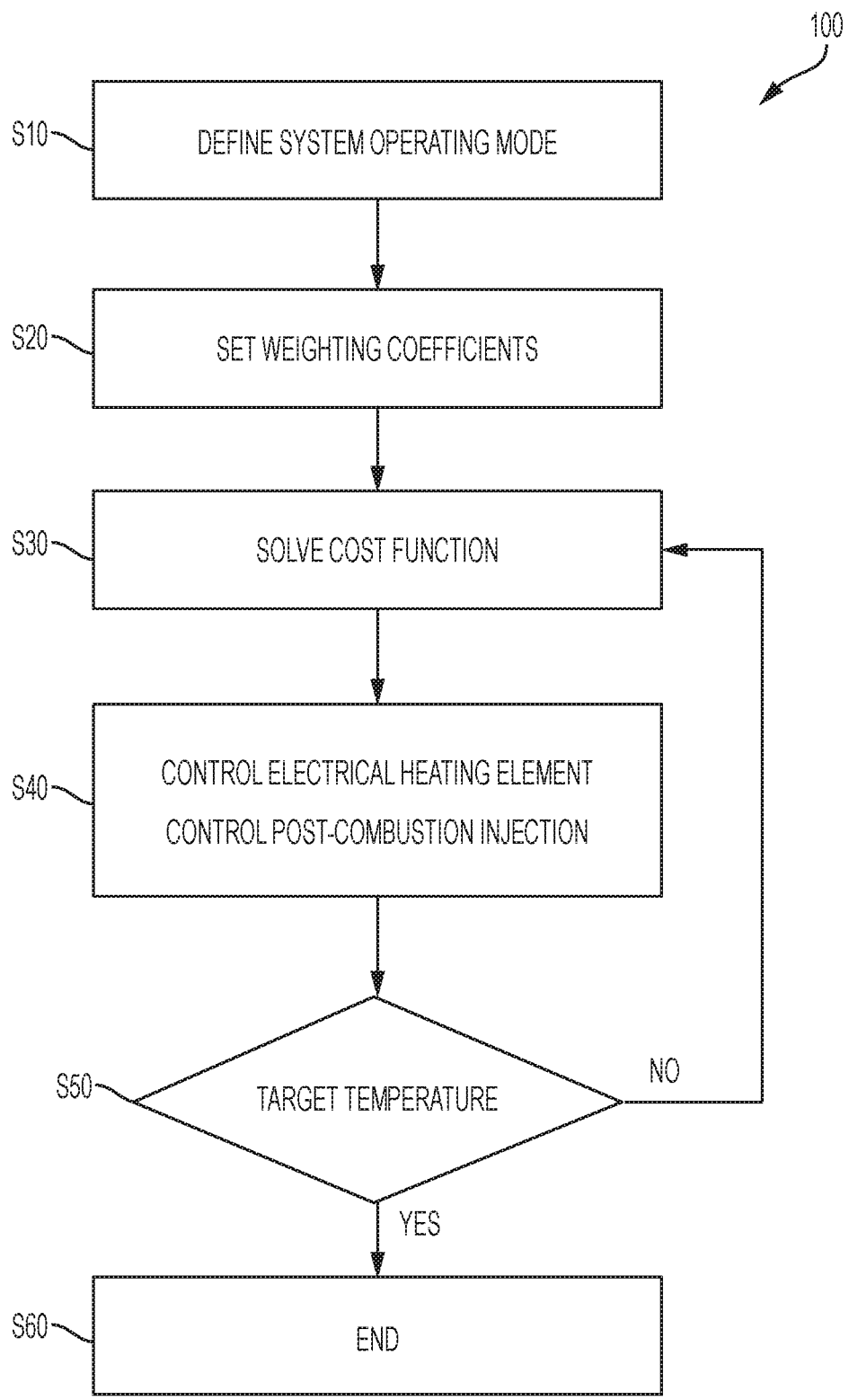
FIG. 3 is a flowchart illustrating a method for controlling an aftertreatment system of a vehicle in accordance with the herein described embodiments.

The following detailed description is merely exemplary in nature and is not intended to limit the invention or the application and uses of the invention. Furthermore, there is no intention to be bound by any theory presented in the preceding background of the invention or the following detailed description.

As used herein, the term module refers to any hardware, software, firmware, electronic control component, processing logic, and/or processor device, individually or in any combination, including without limitation one or more application specific integrated circuits (ASIC), electronic circuits, processors (shared, dedicated, or group) and memory that execute software or firmware programs, combinational logic circuits, and/or other suitable components that provide the described functionality. To some extent, the embodiments disclosed herein are described in terms of functional and/or logical block components and various methods, processes or steps that may be realized by any number of hardware, software, and/or firmware components configured to perform the specified functions. Conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional or logical relationships as well as physical couplings between the various elements. It should be noted that many alternative or additional relationships and/or couplings may be present in an embodiment of the present disclosure.

Some embodiments may include a vehicle 8 that as shown in FIG. 1 includes an internal combustion engine (ICE) or simply engine 10 of conventional construction including an engine block defining at least one cylinder having a piston coupled to rotate a crankshaft. A cylinder head cooperates with the piston to define a combustion chamber. A fuel and air mixture is disposed in the combustion chamber and ignited, resulting in hot expanding exhaust gases causing reciprocal movement of the piston. The fuel is provided by at least one fuel injector 12 and the air through at least one intake port from an intake manifold. The fuel is provided at high pressure to the fuel injector 12 from a fuel rail in fluid communication with a high-pressure fuel pump that increase the pressure of the fuel received a fuel source. Each of the cylinders has at least two valves, actuated by a camshaft rotating in time with the crankshaft. The valves selectively allow air into the combustion chamber and alternately allow exhaust gases to exit through an exhaust port.

The air may be distributed to the air intake port(s) through the intake manifold. An air intake duct may provide air from the ambient environment to the intake manifold. In other embodiments, a throttle body may be provided to regulate the flow of air into the manifold. In still other embodiments, a forced air system such as a turbocharger, having a compressor rotationally coupled to a turbine, may be provided. Rotation of the compressor increases the pressure and temperature of the air in the duct and manifold, and an intercooler disposed in the duct may reduce the temperature of the air.

Exhaust gases EG produced by the engine 10 are communicated to an exhaust system 16, which in accordance with the herein described embodiments includes an exhaust gas after-treatment system 18 including one or more exhaust after-treatment devices. The after-treatment devices may include any device or combination of devices configured to change the composition of the exhaust gases EG. As depicted in FIG. 1, the aftertreatment system 18 includes a diesel oxidation catalyst (DOC) 20, a diesel particular filter (DPF) 24 and a selective catalytic reduction unit (SCR) 28. As illustrated, one or more of these devices may include an electronic heating element 22, 26, 30 operable to provide a heat input for the device when electric power is applied thereto. The exhaust gases EG are directed through the aftertreatment system 18 and emitted from the vehicle 10 as treated exhaust gases TEG.

Some other examples of after-treatment devices include, but are not limited to, catalytic converters (two and three way), lean NOx traps, and hydrocarbon adsorbers. The diesel particular filter (DPF) 20 may be combined with an SCR into a single device, which is often referred to as an SCRF device. Other embodiments may further include an exhaust gas recirculation (EGR) system coupled between the exhaust manifold and the intake manifold. The herein described embodiments are amenable to virtually any combination of after-treatment devices, and it is typical that the after-treatment system 18 will include more than one such device.

A control structure 40 is operatively associated with the engine 10 and aftertreatment system 18 and, in accordance with the herein described embodiments, at least includes an electronic control unit or ECU 42 and a heater control module or HCM 44. The HCM 44, while depicted stand-alone, may form a portion of or be combined with a broader after-treatment system model structure within the control structure 40, and for example, the HCM 44 may be combined with or be a component of the ECU 42. In the embodiment depicted, the ECU 42 and the HCM 44 are operatively coupled to receive data from one or more sensors and/or devices 46 associated with the engine 10 and the aftertreatment system 18, which is represented as sensor and modules data hereinafter referred to as $U_{SMD}$ 48. In particular, $U_{SMD}$ 48 may be generated by sensors in proportion to various physical parameters associated with the engine 10 and the aftertreatment system 18. The engine-related sensors and/or devices 46 may include, but are not limited to, an air mass flow and an engine temperature sensor, a manifold pressure and temperature sensor, a combustion pressure sensor, coolant and oil temperature and level sensors, a fuel rail pressure sensor, a cam position sensor, a crank position sensor, an exhaust pressure sensor and an exhaust temperature sensor, an exhaust gas flow sensor, an EGR temperature sensor, and an accelerator pedal position sensor. Furthermore, the ECU 42 and/or HCM 44 may generate control commands and/or output signals to various control devices configured to control the operation of the engine 10 and/or the aftertreatment system 18, including, but not limited to, fuel injectors 12, a throttle body actuator, aftertreatment injectors, electrical heating elements 22, 26, 30 or other devices forming part of the engine 10 or aftertreatment system 18. The ECU 42 and/or HCM 44 may furthermore receive additional control data or input signal from other sensors and/or devices 50 more generally associated with the vehicle 8, such as but not limited to, ambient air temperature, ambient air pressure, vehicle speed, gear selected, and the like, which is represented as sensor and module data hereinafter referred to as CIs 52.

Each of the ECU 42 and the HCM 44 may include a digital central processing unit (CPU) having a microprocessor in communication with a memory system, or data carrier, and an interface bus. The microprocessor is configured to execute instructions stored as a program in the memory system, and send and receive signals to/from the interface bus. The memory system may include various storage types including optical storage, magnetic storage, solid-state storage, and other non-volatile memory. The interface bus may be configured to send, receive, and modulate analog and/or digital signals to/from the various sensors and control devices. The program may embody the methods disclosed herein, allowing the ECU 42 and the HCM 44 to carryout out such methods and control the engine 10 and the aftertreatment system 18. Instead of a CPU, the ECU 42 and/or the HCM 44 may have a different type of processor to provide the electronic logic, e.g. an embedded controller, an onboard computer, or any processing module that might be deployed in the vehicle 10. Alternately, the HCM 44 may be incorporated into the ECU 42.

Programs stored in the memory system of the CPU may be transmitted from outside via a cable or in a wireless fashion. Outside the vehicle 10 it is normally visible as a computer program product, which is also called computer readable medium or machine readable medium in the art, and which should be understood to be a computer program code residing on a carrier, which may be transitory or non-transitory in nature, with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are for example made use of when transmitting computer program code in a wireless fashion via a WiFi connection to a laptop.

In case of a non-transitory computer program product, the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

As noted above, the aftertreatment devices 20, 24, 28 include heating elements 22, 26, 30 that use electrical power to rapidly heat the devices 20, 24, 28 for shortening a warm up time, reducing the reliance on fuel based warm-up strategies, and controlling catalyst temperatures during aftertreatment combustions modes such as DeNOx events and DPF regeneration. Given that on-board electrical power is either generated by an increase engine load condition to drive an alternator (fueled electrical energy) or recovered during a vehicle coast phase (unfueled electrical energy), the distribution of electrical power to the various vehicle systems is strictly managed. In accordance with the present disclosure, the control structure 40, and more particularly the HCM 44 is implemented to manage electrical power supplied to the heating elements 22, 26, 30 in an optimal manner using a robust and predictive strategy which includes a linear, time-invariant thermal model of the aftertreatment system and an electrical energy cost function based on an output/state cost and an input cost. The HCM 44 is based on model predictive control or MPC that uses a thermal model of the aftertreatment system, a history of past heating control operations and an optimization of the cost function over time to determine heating element control commands.

In accordance with the present disclosure, the thermal model of the aftertreatment system 18 takes into account the thermal resistance (R), the thermal capacity (C) and the inlet temperature (x) for each aftertreatment device 20, 24, 28, as well as the thermal input (U) including the engine heat input from the exhaust gases ($U_1$), which is a function of the engine speed, engine load and post-combustion fuel injection pattern, and the electrical heat input from the electrical heating elements 22, 26, 30 ($U_2$), which is a function of the electrical power and the exhaust flow rate. This thermal model is schematically illustrated in FIG. 2 and includes a thermal representation of the DOC 20 ($R_1$, $C_1$ and $x_1$), a thermal representation of the DPF 24 ($R_2$, $C_2$ and $x_2$), and a thermal representation of the SCR 28 ($R_3$, $C_3$ and $x_3$). Applying these representations, a thermal model of the aftertreatment system 18 is computed as follows:

$$\dot{x} = Ax + Bu \qquad (1)$$

wherein:

$$x = \begin{bmatrix} x_1 \\ x_2 \\ x_3 \end{bmatrix} \quad u = [U_1 + U_2]$$

$$A = \begin{bmatrix} \frac{-1}{C_1 R_2} & \frac{-1}{C_1 R_2} & 0 \\ \frac{1}{C_2 R_2} & \frac{-(R_3 + R_2)}{C_2 R_2 R_3} & \frac{1}{C_2 R_3} \\ 0 & \frac{1}{R_3} & \frac{-1}{R_3} \end{bmatrix} \quad B = \begin{bmatrix} \frac{1}{C_1} \\ 0 \\ 0 \end{bmatrix}$$

The cost function is implemented in a model predictive control (MPC) to provide an optimized cost function (J) over a finite time-horizon (k) which accounts for a heat input resulting from the combustion process, namely the engine heat input and a heat input resulting from the electrical heating element(s), namely the electrical heat input. The cost function J(k) includes a cost factor $J_Y(k)$ based on output/state cost of the system and a cost factor $J_Y(k)$ based on input cost of the system. In equation form, the cost function may be represented as follows:

$$J(k) = J_Y(k) + J_U(k) \qquad (2)$$

wherein $J_Y(k)$ is cost related to the engine heat input for the aftertreatment system 18 as follows:

$$J_Y(k) = \Sigma_{i=1}^P \{ w_{x1}[r_1(k+i|k) - x_1(k+i|k)]^2 + w_{x2}[r_2(k+i|x_2k) - x_2(k+i|k)]^2 + w_{x3}[r_3(k+i|k) - x_3(k+i|k)]^2 \} \qquad (3)$$

and $J_U(k)$ is the cost related to the fuel consumption for generating the electrical power necessary for the electrical heat input for the aftertreatment system 18 as follows:

$$J_U(k) = \Sigma_{i=1}^P \{ w_{U1}[U_{f1}(k+i|k)]^2 w_{U2}[U_{f2}(k+i|k)]^2 \} \qquad (4)$$

The constraints for the output/states are as follows:

$$\begin{bmatrix} x_1 \\ x_2 \\ x_3 \end{bmatrix} < \begin{bmatrix} x_{m1} \\ x_{m2} \\ x_{m3} \end{bmatrix}$$

wherein:
$x_1$=actual temperature of device 20;
$x_2$=actual temperature of device 24;
$x_3$=actual temperature of device 28;
$x_{m1}$=maximum temperature of device 20;
$x_{m2}$=maximum temperature of device 24;
$x_{m3}$=maximum temperature of device 28;
$r_1$=target temperature of device 20;
$r_2$=target temperature of device 24;
$r_3$=target temperature of device 28;
$U_{f1}$=fuel flow equivalent to activate the electrical heating element(s);
$U_{f2}$=fuel flow for post-combustion injections;
$W_{x1}$=weighting coefficient indicating importance of temperature for device 20;

$W_{x2}$=weighting coefficient indicating importance of temperature for device 24;

$W_{x3}$=weighting coefficient indicating importance of temperature for device 28;

$W_{U1}$=weighting coefficient indicating penalty for large changes in electrical heat input;

$W_{U2}$=weighting coefficient indicating penalty for large changes in engine heat input;

p=number of samples for the prediction horizon; and k=current sample time

The fuel flow equivalent to activate the electrical heating element represents the cost of on-board electrical energy generation as a ratio of the alternator torque and the total combustion torques multiplied by the fuel injected and divided by the electrical energy. Since there is a storage system in the form of an on-board battery, a history of the electrical generation should also be considered. Using these assumptions, the fuel flow equivalent to activate an electrical heating element 22 ($U_{f1}$) associated with the DOC 20 is computed as follows:

$$U_{f1} = \int \frac{T_a}{T_i} q\, dt \bigg/ \int \frac{dt}{E_a} \quad (5)$$

wherein:

$T_a$=alternator torque;

$T_i$=total combustion torque;

q=fuel injected; and $E_a$=electrical energy.

Thus, the algorithm and control method described herein is suitable for optimized thermal management of the DOC 20. One skilled in the art should appreciate that the algorithm and control method may be modified and/or expanded for optimized thermal management of the DPF 24 and/or SCR 28 and the associated electrical heating elements 26, 30 using the same principles as set forth above for the DOC 20.

The thermal model, cost function, fuel flow equivalent and MPC are executed in the HCM 44 based on the $U_{SMD}$ 48 and CIs 52 from the engine 10 and aftertreatment system 18. With reference now to FIG. 3, flowchart 100 illustrates a process flow executed by the HCM 44 to manage power supplied to the electrical heating elements 36, 38. Initially, a target mission or desired system operating mode of the aftertreatment system 18 is defined at S10 based on the current ambient conditions and operating state of the engine 10 and aftertreatment system 18 determined from current $U_{SMD}$ 48 and CIs 52. For example, an operating mode to achieve fast warm up of the DOC 20 and lower fuel economy may be desired upon a cold engine start, namely DOC light-off such that the target temperature ($r_1$) of the DOC 20 is set at the light-off temperature of that device (e.g. 350-400° C.).

At S20, the optimization weighting coefficients are set based on the desired system operating mode. Each weighting coefficient is a number between zero and one for indicating the priority of a given parameter associated with the aftertreatment system 18. For example, in the DOC light-off mode, the measured temperature of DOC 20 ($x_1$) is highly significant such that the weighting coefficient ($W_{x1}$) is set to 1.0, and the measured temperature of the DPF 24 ($x_2$) and SCR 28 ($x_3$) are insignificant such that the weighting coefficients ($W_{x2}$, $W_{x3}$) are set to 0.0. In the DOC light-off mode, a lower fuel economy is acceptable to allow for heat input from the electrical heating element 22 and/or a fuel rich exhaust gas but there is a penalty associated with these effects on fuel consumption. In this case, the weighting coefficients ($W_{u1}$, $W_{u2}$) penalizing relative large changes associated with fuel flow equivalent to activate the electrical heating element 22 ($u_1$) and fuel flow for post-combustion injections ($u_2$) are set to 0.5.

At S30, the cost function J provided by the MPC in equations (2), (3) and (4) above is solved to yield an optimized heat input from the electrical heating element 22 and an optimized heat input from post-combustion injection of the fuel injectors 12 for the given targets, weighting and constraints of the DOC light-off mode. At S40, the ECU 42 generates fuel injection signals including post-combustion injections to affect the optimized heat input from the engine 10 and/or the DOC 20. Additional engine operating parameters made are controlled to affect the optimized heat input including the exhaust gas temperature or flow rate or the engine speed or load. Similarly, at S40 the HCM 44 generates a heater control signal to affect the optimized heat input from the electrical heating element 22. At S50, the actual temperature ($x_1$) of the DOC 20 is measured and a comparison is made to determine if the target temperature ($r_1$) has been reached. If the target temperature has not been reached, then the MPC is updated and the process returns to S30 where the cost function is solved and an updated optimized heat input from the electrical heating element 22 and an updated optimized heat input from the engine 10 and aftertreatment system 18 including post-combustion injections is computed. When the target temperature has been reached, then the control process is terminated at S60. By applying this DOC light-off control strategy, the aftertreatment system 18 is operated in a manner which provides rapid warm-up of the DOC 20, while at the same time efficiently balances the trade-offs between post-combustion fuel injections and heated catalyst power for generating the necessary heat input to reach the target temperature.

Another system operating mode may provide for fast warm of the DPF 24 in city driving condition where the engine load and/or speed vary significantly over time, namely DPF warm-up. In this system operating mode, the target temperature ($r_2$) for passive regeneration of the DPF 24 (e.g., 250-400° C.) is the controlling parameter in the system. Again, the optimization weighting coefficients are set at S20 based on DFP warm-up mode in which the measured temperature of DFP 24 ($x_2$) is highly significant such that the weighting coefficient ($W_{x2}$) is set to 1.0, and the measured temperature of the DOC 20 ($x_1$) and SCR 28 ($x_3$) are insignificant such that the weighting coefficients ($W_{x1}$, $W_{x3}$) are set to 0.0. In the DFP warm-up mode, the driving inputs for the vehicle 8 and engine 10 dictate the engine load such that there is no penalty associated with the DFP warm-up mode on fuel consumption. In this case, the weighting coefficients ($W_{u1}$, $W_{u2}$) are also set to 0.0.

At S30, the cost function J provided by the MPC in equations (2), (3) and (4) above is solved to yield an optimized heat input from an electrical heating element and an optimized heat input from the engine exhaust gases for the given targets, weighting and constraints of the DFP warm-up mode. At S40, the ECU 42 generates fuel injection signals including post-combustion injections to affect the optimized heat input from the engine 10 and/or the aftertreatment system 18. Similarly, at S40 the HCM 44 generates a heater control signal to affect optimized heat input from the electrical heating element. At S50, the actual temperature ($x_2$) of the DFP 24 is measured and a comparison is made to determine if the target temperature ($r_2$) has been reached. then the MPC is updated and the process returns to S30 where the cost function is solved and an updated optimized heat input from the electrical heating element and an updated optimized heat input from the engine 10 and the aftertreatment system 18 including post-combustion injections is computed. When the target temperature has been reached, then the control process is terminated at S60. By applying this control strategy (DFP warm-up), the aftertreatment system 18 is operated in a manner which provides rapid warm-up of the DPF 24, while at the same time maximizing the thermal power contributions from post-combustion fuel injections and heated catalyst power for generating the necessary heat input to reach the target temperature.

Yet another system operating mode maintains the temperature of the DPF 24 in a range effective for active regeneration of the DPF 24, namely DPF Regen such that the target temperature ($r_2$) is set at a temperature typically above 550° C. Again, the optimization weighting coefficients are set at S20 based on DFP Regen mode in which the measured temperature of DFP 24 ($x_2$) is highly significant such that the weighting coefficient ($W_{x2}$) is set to 1.0, and the measured temperature of the DOC 20 ($x_1$) and SCR 28 ($x_3$) are insignificant such that the weighting coefficients ($W_{x1}$, $W_{x3}$) are set to 0.0. In the DFP Regen mode, the driving inputs for the vehicle 8 and engine 10 dictate the engine load such that there is no penalty associated with the DFP warm-up mode on fuel consumption. In this case, the weighting coefficients ($W_{u1}$, $W_{u2}$) are also set to 0.0.

At S30, the cost function J provided by the MPC in equation (2), (3) and (4) above is solved to yield the optimized heat input from the electrical heating element and the optimized heat input from the exhaust gases for the given targets, weighting and constraints of the DFP Regen mode. At S40, the ECU 42 generates fuel injection signals including post-combustion injections to affect the optimized heat input from the engine 10 and/or the aftertreatment system 18. Similarly, at S40 the HCM 44 generates a heater control signal to affect the optimized heat input from the electrical heating element. At S50, the actual temperature ($x_2$) of the DFP 24 is measured and a comparison is made to determine if the target temperature ($r_2$) has been reached. If the target temperature has not been reached, then the MPC is updated and the process returns to S30 where the is returned to solve the cost function for an updated optimized heat input from the electrical heating element and an updated optimized heat input from the engine 10 and aftertreatment system 18 including post-combustion injections. If the target temperature has been reached, then the control process is terminated at S60. By applying this control strategy (DFP Regen), the aftertreatment system 18 is operated in a manner which maintains the temperature of the DPF 24 at the target regeneration temperature, while at the same time optimizing the thermal power contributions from post-combustion fuel injections and heated catalyst power.

One skilled in the art should recognize that additional system operating modes such as a fuel efficiency mode which prioritizes fuel economy, or an electrical efficiency mode which prioritizes electrical power generation or a combination of the modes described herein may be implements at S10 and the corresponding weighting coefficients set at S20 based on the desired operating state of the engine 10 and various devices in an aftertreatment system 18. One skilled in the art should also recognize that the cost function J provided by the MPC in equation (5) above can be solved at S30 to yield the optimum control of electrical heating element and the post-combustion injection for any desired mode. While the aftertreatment system 18 and the control thereof has been described in terms of a system having a DOC 20, DFP 24 and an SCR 28, one skilled in the art should also recognize that the method of control described herein is equally applicable to other systems which vary in the number and type of aftertreatment devices, provided one of the devices include an electrical heating element.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method for controlling an exhaust gas aftertreatment system of a vehicle comprising:
   determining a system operating mode including a target temperature for an aftertreatment device having an electrical heating element;
   setting a weighting coefficient based on the determined system operating mode;
   determining an optimized electrical heat input for the electrical heating element and an optimized engine heat input from post-combustion injection of fuel into the exhaust gas based on the weighting coefficient; and
   controlling the electrical heating element based on the optimized electrical heat input and the controlling the post-combustion injection of fuel based on the optimized fuel heat input.

2. The method of claim 1, further comprising:
   providing a predetermined thermal model of the aftertreatment device; and
   determining an optimized electrical heat input for the electrical heating element and an optimized engine heat input from post-combustion injection of fuel into the exhaust gas based on the thermal model.

3. The method of claim 1, further comprising determining the optimized electrical heat input and the optimized engine heat input based on an optimized cost function.

4. The method of claim 1, further comprising controlling at least one of an exhaust temperature and an exhaust flow rate based on the optimized engine heat input.

5. The method of claim 1, further comprising controlling at least one of an engine speed and an engine load based on the optimized engine heat input.

6. The method of claim 1, wherein determining an optimized electrical heat input for the electrical heating element further comprises:
   determining a fuel flow equivalent for activating the electrical heating element; and
   determining the optimized electrical heat input and the optimized engine heat input based on the fuel flow equivalent.

7. The method of claim 1, further comprising determining the optimized electrical heat input and the optimized engine heat input to minimize fuel consumption of the vehicle.

8. The method of claim 1, wherein the system operating mode is selected from a group consisting of: a catalyst light-up mode, a filter warm-up mode, a filter regeneration mode, a fuel efficiency mode, an electrical efficiency mode, or a combination thereof.

9. The method of claim 1, further comprising:
   determining a second system operating mode including a target temperature for a second aftertreatment device having a second electrical heating element;
   setting a second weighting coefficient based on the second system operating mode;
   determining a second optimized electrical heat input for the second electrical heating element and a second optimized engine heat input from post-combustion injection of fuel into the exhaust gas based on the second weighting coefficient; and
   controlling the electrical heating element based on the second optimized electrical heat input and the controlling the post-combustion injection of fuel based on the second optimized fuel heat input.

10. An aftertreatment system of an internal combustion engine for a vehicle comprising: an engine control unit in communication with the engine and configured to control an operating state thereof;
   an exhaust system including an aftertreatment device having an electrical heating element;
   an exhaust sensor network in communication with the exhaust system, the sensor network configured to measure an exhaust temperature, an exhaust flow rate, and an exhaust oxygen level; and
   an electrical system in communication with the electrical heating element and configured to supply electric power to the electrical heating element,
   a heater control module in communication with the electrical system and the engine control unit, wherein the heater control module is configured to:
     determine an optimized electrical heat input for the electrical heating element and an optimized engine heat input from post-combustion injection of fuel into the exhaust gas based on a system operating mode including a target temperature for an aftertreatment device and a weighting coefficient for the system operating mode;
     control the electric power supplied to the electrical heating element for generating an electrical heat input to the aftertreatment device based on the optimized electrical heat input; and
     instruct an engine control unit to control post-combustion injection of fuel based on the optimized fuel heat input.

11. The system of claim 10, wherein the heater control module is further configured to control the electrical heating element to a target temperature based on a predetermined thermal model for the aftertreatment device.

12. The system of claim 10, wherein the engine control unit is further configured to control at least one of an exhaust temperature and an exhaust flow rate based on the optimized engine heat input.

13. The system of claim 10, wherein the heater control module is further configured to:
   determine a fuel flow equivalent for activating the electrical heating element; and
   determine the optimized electrical heat input and the optimized engine heat input based on the fuel flow equivalent.

14. The system of claim 10, wherein the heater control module is further configured to determine the optimized electrical heat input and the optimized engine heat input based on an optimized cost function.

15. The system of claim 14, wherein the optimized cost function $J(k)$ is defined by:

$$J(k) = J_Y(k) + J_U(k)$$

wherein:

$$J_Y(k) = \sum_{i=1}^{p} \{w_{x1}[r_1(k+i|k) - x_1(k+i|k)]^2 + w_{x2}[r_2(k+i|x_2k) - x_2(k+i|k)]^2 + w_{x3}[r_3(k+i|k) - x_3(k+i|k)]^2\}$$

$$J_U(k) = \sum_{i=1}^{p} \{w_{U1}[U_{f1}(k+i|k)]^2 + w_{U2}[U_{f2}(k+i|k)]^2\}$$

wherein:
  $x_1$=actual temperature of device 20;
  $x_2$=actual temperature of device 24;
  $x_3$=actual temperature of device 28;
  $x_{m1}$=maximum temperature of device 20;
  $x_{m2}$=maximum temperature of device 24;
  $x_{m3}$=maximum temperature of device 28;
  $r_1$=target temperature of device 20;
  $r_2$=target temperature of device 24;
  $r_3$=target temperature of device 28;
  $U_{f1}$=fuel flow equivalent to activate the electrical heating element(s);
  $U_{f2}$=fuel flow for post-combustion injections;
  $W_{x1}$=weighting coefficient indicating importance of temperature for device 20;
  $W_{x2}$=weighting coefficient indicating importance of temperature for device 24;
  $W_{x3}$=weighting coefficient indicating importance of temperature for device 28;
  $W_{U1}$=weighting coefficient indicating penalty for large changes in electrical heat input;
  $W_{U2}$=weighting coefficient indicating penalty for large changes in engine heat input;
  p=number of samples for the prediction horizon;
  k=current sample time; and
  the constraints are as follows:

$$\begin{bmatrix} x_1 \\ x_2 \\ x_3 \end{bmatrix} < \begin{bmatrix} x_{m1} \\ x_{m2} \\ x_{m3} \end{bmatrix}$$

16. The system of claim 10, further comprising a particulate filter in communication with the exhaust system.

17. The system of claim 10, wherein the system operating mode is selected from a group consisting of: a catalyst light-up mode, a filter warm-up mode, a filter regeneration mode, a fuel efficiency mode, an electrical efficiency mode, or a combination thereof.

18. A vehicle comprising:
   a diesel engine having an exhaust system;
   an engine control unit in communication with the diesel engine, the engine control unit configured to control an operating state of the diesel engine;
   an exhaust sensor network in communication with the exhaust system, the sensor network configured to measure an exhaust temperature, an exhaust flow rate, and an exhaust oxygen level; and
   an electrical system in communication with the electrical heating element and configured to supply electric power to the electrical heating element,
   an aftertreatment system in communication with the exhaust system and including an aftertreatment device having an electrical heating element;

a heater control module in communication with the electrical system and the engine control unit, wherein the heater control module is configured to:

determine an optimized electrical heat input for the electrical heating element and an optimized engine heat input from post-combustion injection of fuel into the exhaust gas based on a system operating mode including a target temperature for an aftertreatment device and a weighting coefficient for the system operating mode;

control the electric power supplied to the electrical heating element for generating an electrical heat input to the aftertreatment device based on the optimized electrical heat input; and instruct an engine control unit to control post-combustion injection of fuel based on the optimized fuel heat input.

19. The vehicle of claim 18, wherein the heater control module is further configured to:

determine a fuel flow equivalent for activating the electrical heating element; and determine the optimized electrical heat input and the optimized engine heat input based on the fuel flow equivalent.

20. The system of claim 18, wherein the system operating mode is selected from a group consisting of: a catalyst light-up mode, a filter warm-up mode, a filter regeneration mode, a fuel efficiency mode, an electrical efficiency mode, or a combination thereof.

* * * * *